United States Patent
Park

(10) Patent No.: US 9,542,370 B2
(45) Date of Patent: Jan. 10, 2017

(54) METHOD AND APPARATUS FOR SHARING JAVASCRIPT OBJECT IN WEBPAGES

(71) Applicant: Alticast Corporation, Seoul (KR)

(72) Inventor: Jong Hoon Park, Seoul (KR)

(73) Assignee: Alticast Corporation, Seoul (KR)

( * ) Notice: Subject to any disclaimer, the term of this patent is extended or adjusted under 35 U.S.C. 154(b) by 212 days.

(21) Appl. No.: 14/014,829

(22) Filed: Aug. 30, 2013

(65) Prior Publication Data

US 2014/0068414 A1 Mar. 6, 2014

(30) Foreign Application Priority Data

Aug. 30, 2012 (KR) .......... 10-2012-0095663

(51) Int. Cl.
*G06F 17/00* (2006.01)
*G06F 17/22* (2006.01)
*G06F 9/455* (2006.01)

(52) U.S. Cl.
CPC ....... *G06F 17/2247* (2013.01); *G06F 9/45529* (2013.01)

(58) Field of Classification Search
CPC .......... H04N 5/445–5/44595; H04N 2005/445–2005/44595; H04N 21/482–21/4888; G06F 17/2247
See application file for complete search history.

(56) References Cited

U.S. PATENT DOCUMENTS

2004/0003400 A1* 1/2004 Carney et al. .......... 725/42
2004/0230906 A1* 11/2004 Pik .......... G06F 17/30873 715/229
2011/0157637 A1* 6/2011 Kimura .......... 358/1.15

OTHER PUBLICATIONS

Frank, Thomas, Session Variables Without Cookies, published Jan. 20, 2008 at http://www.thomasfrank.se/sessionvars.html.*

* cited by examiner

*Primary Examiner* — Keith Bloomquist
(74) *Attorney, Agent, or Firm* — Mintz Levin Cohn Ferris Glovsky and Popeo, P.C.; Kongsik Kim; Jonathon Western

(57) ABSTRACT

A method and apparatus for sharing webpage JavaScript objects are disclosed. An embodiment of the invention provides a method for sharing JavaScript objects of webpages that are provided by a server by way of a browser executed at a user client. The method includes: (a) storing a shared JavaScript object from among one or more JavaScript objects of a first webpage in a predefined object storage area; (b) checking for a shared JavaScript object in a second webpage; and (c) forming the second webpage with the shared JavaScript object extracted, where the object storage area is positioned in a JavaScript context.

4 Claims, 3 Drawing Sheets

METHOD AND APPARATUS FOR SHARING JAVASCRIPT OBJECT IN WEBPAGES

CROSS-REFERENCE TO RELATED APPLICATIONS

This application claims the benefit of Korean Patent Application No. 10-2012-0095663, filed with the Korean Intellectual Property Office on Aug. 30, 2012, the disclosure of which is incorporated herein by reference in its entirety.

TECHNICAL BACKGROUND

The present invention relates to a method and apparatus for sharing webpage JavaScript objects, more particularly to a method and apparatus that allow an efficient sharing of JavaScript objects in different webpages.

RELATED ART

A webpage is a collective term referring to web documents on the Internet, where a webpage can be embedded with various text, as well as image, sound, and video files.

Two or more webpages can be interconnected by hyperlinks, and such webpages may be composed of HTML (or XHTML), CSS, JavaScript, images, and video clips such as Flash. A webpage may be transmitted or received via HTTP.

CSS (Cascading Style Sheets) is a language for describing the method by which a markup language is actually displayed, and is used when defining the layout and style.

CSS has several levels and profiles, where the profiles are typically subsets of one or more levels of CSS built for a particular device or user interface. Currently, there are profiles for mobile devices, printers, and TV sets.

JavaScript is an object-based script programming language, is used for creating interactive forms within a webpage, and is defined by the SCRIPT tag in an HTML document.

In JavaScript, numerous objects are defined, which are used to form interactive elements and perform processing for user events.

As mentioned above, a webpage may include HTML (or XHTML), CSS, and JavaScript, but since each webpage is independent, there may be difficulty in sharing JavaScript objects in different webpages.

One method of sharing JavaScript objects in a client-server structure is to use cookies or a local storage at the client end.

However, the browser context for displaying information and the JavaScript context for processing interactive elements have different implementation architectures.

Thus, when using the above method, a JavaScript object may have to be converted into a form compatible with the browser's architecture and kept in the browser, and when it is needed in another webpage, may have to be converted again to be compatible with the JavaScript context.

Also, while it is possible to share JavaScript objects by way of the server end, this may entail the problem of inefficiency, as it involves the use of a network.

With the recent development of set-top boxes that are capable of running browsers, digital broadcast services are being provided with the user interface, such as a program guide, for example, based on webpages.

Since the set-top box has a lower capability compared to desktop PC's, etc., there is a need for an efficient method of sharing JavaScript objects in broadcast receiving devices such as set-top boxes.

SUMMARY

To resolve the problems in the related art described above, an aspect of the invention aims to provide a method and apparatus that allow efficient sharing of JavaScript objects in webpages.

To achieve the objective above, an embodiment of the invention provides a method for sharing JavaScript objects of webpages that are provided by a server by way of a browser executed at a user client. The method includes: (a) storing a shared JavaScript object from among one or more JavaScript objects of a first webpage in a predefined object storage area; (b) checking for a shared JavaScript object in a second webpage; and (c) forming the second webpage with the shared JavaScript object extracted, where the object storage area is positioned in a JavaScript context.

The method can further include (d) determining the shared JavaScript object, before step (a).

Step (d) can include determining the shared JavaScript object according to at least one of the data size and the use frequentness of JavaScript objects.

The server can be a headend that emits broadcast signals, while the user client can be a broadcast receiving device that processes the broadcast signals provided by the headend and outputs the broadcast signals to a display unit.

The shared JavaScript object can include at least one of a channel list, a live program list, an on-demand program list, a program poster, and information generated in the JavaScript context.

The headend can determine the shared JavaScript object according to at least one of the data size and the use frequentness of JavaScript objects. The object storage area can be defined on a memory in which the browser is loaded.

Another embodiment of the invention provides a recorded medium readable by a computer that tangibly embodies a program of instructions for performing the method described above.

Yet another embodiment of the invention provides an apparatus for sharing JavaScript objects of webpages. The apparatus includes: an object storage area that is configured to store a shared JavaScript object; and a browser that is configured to provide control such that a shared JavaScript object from among one or more JavaScript objects of a first webpage is stored in the object storage area and configured to check for JavaScript objects required in a second webpage. A web application corresponding to the first webpage interworks with the browser through an API (application programming interface) such that a shared JavaScript object (first object) included in the first webpage is stored in the object storage area, and a web application corresponding to the second webpage interworks with the browser through an API to extract the shared JavaScript object from among the required JavaScript objects from the object storage area to form the second webpage.

According to certain embodiments of the invention, JavaScript objects may be stored in a JavaScript context for sharing, so that the sharing speed may be increased.

Also, according to certain embodiments of the invention, the information that has been obtained already can be reused, making it possible to reduce the use of unnecessary resources (network resources, memory, CPU time, etc.).

Additional aspects and advantages of the present invention will be set forth in part in the description which follows, and in part will be obvious from the description, or may be learned by practice of the invention.

DETAILED DESCRIPTION

Figure 1:
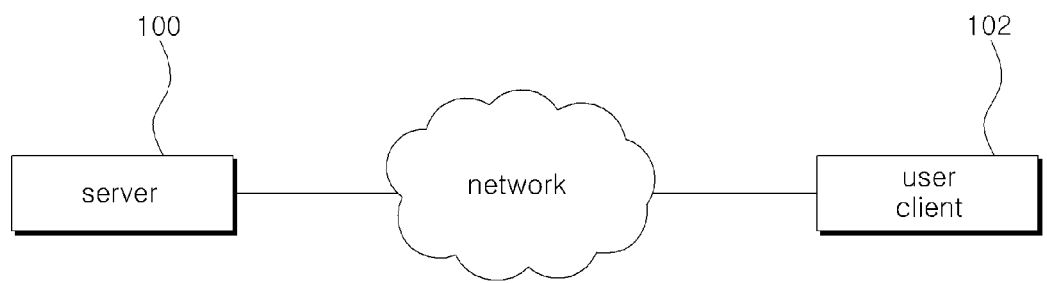
FIG. 1 is a diagram illustrating a webpage JavaScript object sharing system according to an embodiment of the invention.

As the present invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. In describing the drawings, like reference numerals are used for like elements.

Certain embodiments of the invention will be described below in more detail with reference to the accompanying drawings. To aid the overall understanding of the invention, those components that are the same or are in correspondence are rendered the same reference numeral regardless of the figure number.

FIG. 1 is a diagram illustrating a webpage JavaScript object sharing system according to an embodiment of the invention.

As illustrated in FIG. 1, a system according to this embodiment can include a server 100 and a user client 102.

The server 100 may provide webpages according to a request by the user client 102.

As described above, a webpage can include HTML, CSS, and JavaScript.

Preferably, a server 100 according to an embodiment of the invention can be a headend that provides broadcast services, while the user client 102 can be a set-top box that is installed with a browser that is capable of displaying webpages.

The descriptions that follow will be provided using an example in which the server 100 is a headend that provides live programs and on-demand programs according to a preset schedule, as well as the schedule information, etc., of such programs, and in which the user client 102 is a broadcast receiving device such as a set-top box.

The server 100 may convert may convert audio and video signals (AV signals) for various broadcast channels into a pre-designated format, and may transmit the converted broadcast signals to the broadcast user client 102.

Also, the server 100 may receive AV data for programs from multiple content providers, generate schedules of the programs, and transmit a list of channels, a list of live programs, a list of on-demand programs, and posters for the programs to the user client 102.

A user client 102 according to this embodiment may receive broadcast signals, including video, audio, and data, from the server 100, and may decode and output the signals.

The user client 102 according to this embodiment can be a set-top box, but is not thus limited, and can encompass any device capable of receiving broadcast signals and running a browser, including a smart phone, a tablet PC, a desktop PC, etc.

The descriptions that follow will be provided using an example in which the user client 102 is a set-top box connected to a TV set that serves as a display unit.

The user client 102 according to this embodiment may include a signal input interface that is equipped with a tuner and a channel decoder. The tuner may receive broadcast signals in a compressed form, and the channel decoder may extract the channel desired by the user from among the received broadcast signals.

The compressed (encoded) broadcast signals can be composed as complex signals that include at least one of video, audio, and data, and may be extracted and separated by a demux to be outputted to a signal output interface.

The signal output interface can include an audio decoder, a video decoder, and a data decoder, and the signals separated at the demux can pass through the respective decoders to be outputted to the display unit.

The broadcast signals can include not only AV data for programs requested by the user but also a webpage for providing the user with program-related information.

A webpage that provides program-related information can be a menu page and can include, for example, a page for a program guide. More specific examples can include pages that serves as guides for all live programs, programs of various genres, on-demand programs, and programs according to popularity.

According to an embodiment of the invention, the user client 102 may enable the sharing of JavaScript objects in different pages.

The user client 102 may check for JavaScript objects that require sharing in a particular webpage, and pre-store the objects. Later, if another webpage requires the pre-stored JavaScript objects, the user client 102 may extract the objects to form the webpage.

According to an embodiment of the invention, the JavaScript objects that are shared can be determined according to the data size and use frequentness of each object.

The shared JavaScript object can be determined at the server 100 with the information pertaining to this can be transmitted to the user client 102, but the determining can also be performed at a browser running on the user client 102.

A more detailed description is provided below, with reference to the accompanying drawings, of the process for sharing JavaScript objects according to an embodiment of the invention.

Figure 2:
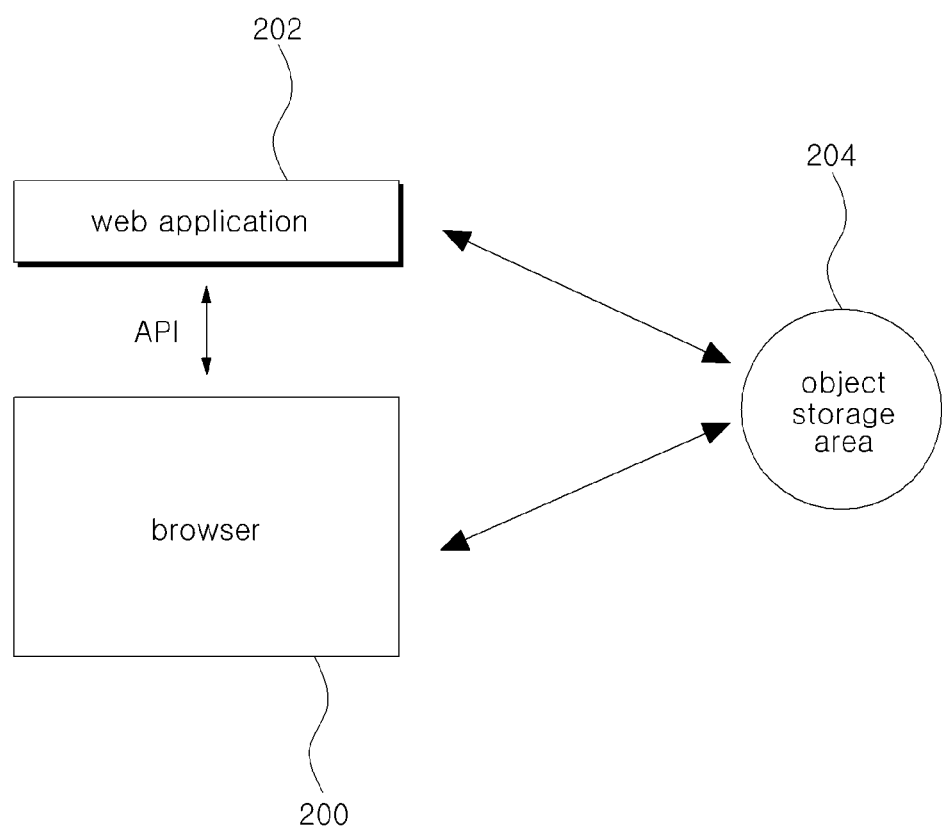
FIG. 2 is a diagram illustrating the detailed composition of a user client according to an embodiment of the invention.

FIG. 2 is a diagram illustrating the detailed composition of a user client according to an embodiment of the invention.

FIG. 2 illustrates only the elements in the user client 102 that relate to webpages.

As illustrated in FIG. 2, the user client 102 according to this embodiment can include a browser 200, a web application 202, and an object storage area 204.

The browser 200 may perform a loading process for reading resource streams transferred via an HTTP module, etc., a parsing process for generating a DOM (document object model) tree, and a process of generating a rendering tree for converting the DOM tree generated by the parsing into a data structure of a format that can be displayed.

Also, the browser 200 may determine the CSS style and may perform a layout process for determining the position and size of each object by using the generated rendering tree.

The web application 202 is positioned at an upper layer of the browser 200 and is defined as an application program that supports the functions provided in a webpage.

A webpage running on the user client 102 can be defined as a web application 202.

The web application 202 may execute the JavaScript included in the webpage.

The JavaScript can include browser objects and implicit objects.

Browser objects include all elements shown in a browser window and form a tree structure, with numerous lower-level objects branching out from the highest-level object shown in the window. Each of the objects are defined by and can be accessed according to a hierarchical structure.

The browser objects can include window objects, location objects, navigation objects, history objects, frame objects, and document objects.

Window objects are the highest-level objects from among the browser-embedded objects, and include all objects other than navigation objects.

Location objects are objects that include information related to the URL of the HTML document that is loaded on the current browser window.

Navigation objects refer to general information of the browser currently being used, while history objects are objects that control the history information recorded on the browser.

Frame objects are objects that assign the positions of certain frames or provide information thereon, in a document that is divided into several frames.

Document objects refer to objects which handle documents or objects of which the results are provided in documents.

The implicit objects refer to Date, Math, String, Array, etc.

Furthermore, JavaScript objects can include user-defined objects, which may be generated using a constructor function and a new keyword.

According to an embodiment of the invention, the browser 200 may interwork with the web application 202 to perform the functions of storing, checking for, and extracting those JavaScript objects of which sharing is required in the webpages.

According to this embodiment, the sharing of JavaScript objects based on the interworking between the browser 200 and the web application 202 can be performed through an API (application programming interface).

According to this embodiment, the browser 200 may check for JavaScript objects for which sharing is required, from among the JavaScript objects included in a first webpage, and may request the web application 202 through the API to store the shared JavaScript objects.

According to this embodiment, an object storage area 204 is provided which interworks with the browser 200, and the shared JavaScript objects requested by the browser 200 as described above may be stored in the object storage area 204.

Preferably, the object storage area 204 can be formed as JavaScript context, and each of the shared JavaScript objects in the object storage area 204 can be assigned a unique address.

Here, an object storage area 204 according to this embodiment may be volatile memory, such as RAM, on which the browser is running, rather than non-volatile memory such as a hard disk and flash memory. According to this embodiment, the storing of the JavaScript objects can be performed as is, without any data conversion.

In cases where cookies and local storage are used, the data may have to be converted into text or into a data tuple format, i.e. converted from the JavaScript context to the browser context, resulting in greater inefficiency.

According to the present embodiment, however, the shared JavaScript objects may be stored temporarily in the memory as JavaScript context, so that they may be stored directly without any data conversion.

When the object storage is performed, the browser 200 may manage information on the pre-stored (shared) objects.

When a shared JavaScript object is needed in another webpage, the web application 202 may extract the information on the JavaScript object that is to be shared from the object storage area 204 in accordance with the control of the browser 200.

More specifically, if a shared JavaScript object is needed in another webpage, the web application 202 may transfer the object information to the browser 200, and the browser 200 may return the address of the object storage area 204 for the requested object to the web application 202.

Figure 3:
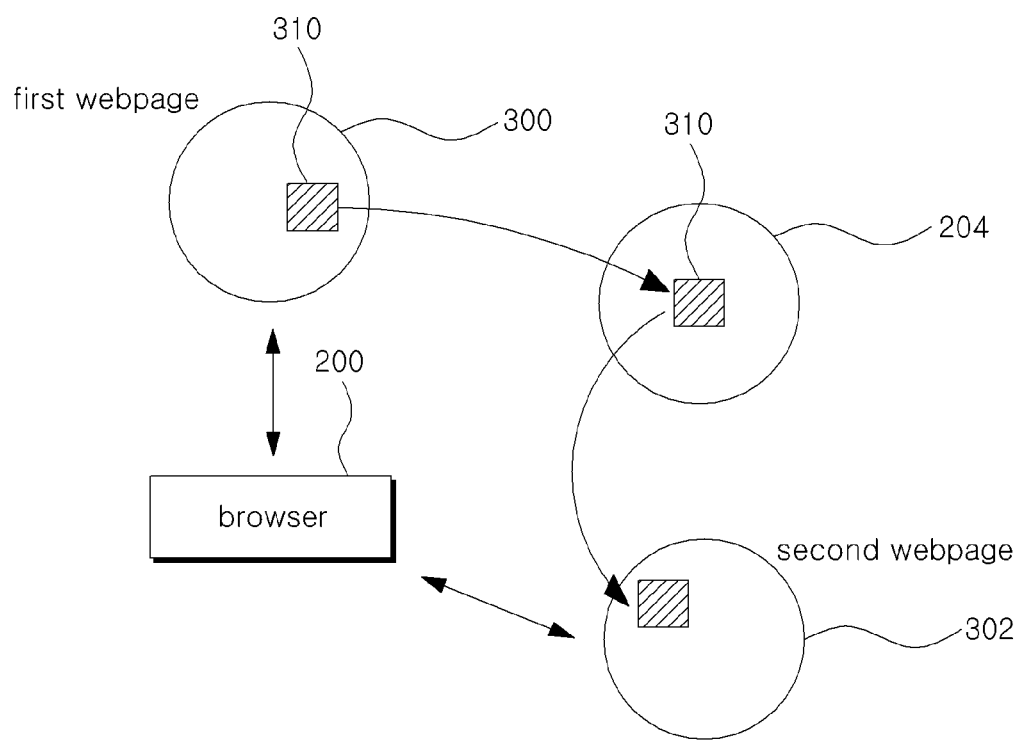
FIG. 3 is a diagram illustrating a process for sharing JavaScript objects according to an embodiment of the invention.

FIG. 3 is a diagram illustrating a process for sharing JavaScript objects according to an embodiment of the invention.

Referring to FIG. 3, the browser 200 may interwork with a web application 202 corresponding to a first webpage 300, to check for JavaScript objects that require sharing and to store the objects 310 that require sharing in the object storage area 204.

From among the JavaScript objects that are to be applied to a second webpage 302, the browser 200 may check for (shared) JavaScript objects that are already stored, and the web application 202 may extract the shared JavaScript objects 310 from the object storage area 204.

Considering that the user client 102 is a broadcast receiving device in this embodiment, it can be preferable to have the shared JavaScript objects determined beforehand as objects having have high use frequentness or large data sizes.

For example, considering broadcast services, a channel list, a live program list, an on-demand program list, and program posters, which may be included in a webpage serving as a program guide, can be provided as JavaScript objects. These lists may be frequently used and may have large data sizes, so that it may be preferable to share these lists in order to increase the speed of webpage construction and reduce the amount of memory used.

Also, according to an embodiment of the invention, the shared JavaScript objects can include information generated in a JavaScript context.

Here, the information generated in a JavaScript context refers to any JavaScript object created during an operation of JavaScript. For example, if JavaScript uses a channel list to generate a "hot channel list" for channels having high real-time popularity levels, then the "hot channel list" can be information generated in a JavaScript context, and this can be a shared JavaScript object that can be used in another page.

The procedures described above can be implemented in the form of program instructions that may be performed using various computer means and can be recorded in a computer-readable medium. Such a computer-readable medium can include program instructions, data files, data structures, etc., alone or in combination. The program instructions recorded on the medium can be designed and configured specifically for the present invention or can be a type of medium known to and used by the skilled person in the field of computer software.

Examples of a computer-readable medium may include magnetic media such as hard disks, floppy disks, magnetic tapes, etc., optical media such as CD-ROM's, DVD's, etc., magneto-optical media such as floptical disks, etc., and hardware devices specially configured to store and execute program instructions such as ROM, RAM, flash memory, etc.

The recorded medium can also be a transmission medium, such as optical rays, metal wires, waveguides, etc., that transports carrier waves for transmitting signals which designate the program instructions, data structures, etc.

Examples of the program of instructions may include not only machine language codes produced by a compiler but also high-level language codes that can be executed by a computer through the use of an interpreter, etc. The hardware mentioned above can be made to operate as one or more software modules that perform the actions of the embodiments of the invention, and vice versa.

The embodiments of the invention described above are disclosed herein for illustrative purposes only. It is to be appreciated that various modifications, alterations, and additions can be made by those of ordinary skill in the art without departing from the technical spirit and scope of the invention, and that such modifications, alterations, and additions are encompassed by the scope of claims set forth below.

What is claimed is:

1. A method for sharing JavaScript objects of webpages provided by a server by way of a browser executed at a user client, the method comprising:
    (a) storing a shared JavaScript object from among one or more JavaScript objects of a first webpage in a predefined object storage area;
    (b) checking for a shared JavaScript object in a second webpage; and
    (c) forming the second webpage with the shared JavaScript object extracted, wherein
    the object storage area is positioned in a JavaScript context,
    the object storage area is defined on a volatile memory in which the browser is loaded,
    the shared JavaScript object is stored temporarily in the volatile memory without being converted into text or a data tuple format,
    the browser returns an address of the object storage area for the shared JavaScript object to the second webpage when the second webpage requests the shared JavaScript object from the browser,
    the shared JavaScript object comprises broadcasting information including at least one of a channel list, a live program list, an on-demand program list, and a program poster, and
    the server determines the shared JavaScript object according to at least one of a data size and a use frequency of JavaScript objects.

2. The method of claim 1, wherein the server is a headend configured to emit broadcast signals, and the user client is a broadcast receiving device configured to process the broadcast signals provided by the headend and output the broadcast signals to a display unit.

3. A recorded medium readable by a computer, tangibly embodying a program of instructions for performing the method according to claim 1.

4. An apparatus for sharing JavaScript objects of webpages provided by a server, the apparatus comprising,
    the apparatus comprising:
    an object storage area configured to store a shared JavaScript object; and
    a browser configured to provide control such that a shared JavaScript object from among one or more JavaScript objects of a first webpage is stored in the object storage area and configured to check for JavaScript objects required in a second webpage, wherein
    a web application corresponding to the first webpage interworks with the browser through an API (application programming interface) such that a shared JavaScript object (first object) included in the first webpage is stored in the object storage area,
    a web application corresponding to the second webpage interworks with the browser through an API to extract the shared JavaScript object from among the required JavaScript objects from the object storage area to form the second webpage,
    the object storage area is defined on a volatile memory in which the browser is loaded,
    the shared JavaScript object is stored temporarily in the volatile memory without being converted into text or a data tuple format,
    the browser returns an address of the object storage area for the shared JavaScript object to the second webpage when the second webpage requests the shared JavaScript object from the browser,
    the shared JavaScript object comprises broadcasting information including at least one of a channel list, a live program list, an on-demand program list, and a program poster, and
    the server determines the shared JavaScript object according to at least one of a data size and a use frequency of JavaScript objects.

* * * * *